United States Patent [19]
Seiler et al.

[11] 3,843,624
[45] Oct. 22, 1974

[54] MONO OR DISAZO DYESTUFFS CONTAINING A DIAMINO, HALOTRIAZINYL OR PYRIMIDINYL SUBSTITUENT

[75] Inventors: Herbert Seiler, Riehen; Paul Dussy, Basel, both of Switzerland

[73] Assignee: Ciba-Geigy AG, Basel, Switzerland

[22] Filed: Feb. 3, 1970

[21] Appl. No.: 8,422

[30] Foreign Application Priority Data
Feb. 26, 1969  Switzerland.......................... 2862/69
July 7, 1969  Switzerland....................... 10311/69

[52] U.S. Cl............... 260/153, 8/41 B, 260/146 D, 260/146 T, 260/154, 260/242, 260/249, 260/249.8, 260/256.4 N, 260/261
[51] Int. Cl.... C09b 62/08, C09b 62/24, D06p 1/38
[58] Field of Search ........ 260/153, 154, 249, 249.8, 260/256.4 N

[56] References Cited
UNITED STATES PATENTS

| | | | |
|---|---|---|---|
| 2,643,996 | 6/1953 | Widmer et al...................... | 260/153 |
| 2,945,022 | 7/1960 | Fasciati et al...................... | 260/153 |
| 2,979,498 | 4/1961 | Andrew et al...................... | 260/153 |
| 3,054,795 | 9/1962 | Staeuble et al. .................. | 260/249 |
| 3,151,105 | 9/1964 | Andrew et al. ..................... | 260/153 |
| 3,326,887 | 6/1967 | Riat et al........................... | 260/153 |
| 3,341,539 | 9/1967 | Staeuble et al. .................... | 260/249 |
| 3,459,729 | 8/1969 | Crotti et al. ........................ | 260/153 |

*Primary Examiner*—Floyd D. Higel
*Attorney, Agent, or Firm*—Wenderoth, Lind and Ponack

[57] ABSTRACT

Valuable reactive dyestuffs containing no acid, salt-forming, water-solubilizing groups and which, among others, can be applied to hydrophobic fibers especially polyamide fibers from organic solvents, especially aprotic solvents correspond to the formula

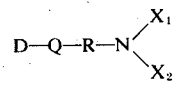

wherein D represents the radical of an organic dyestuff, Q represents the bridging member $-NX_3-$, $-O-$, $-S-$ or $-NX_3CO-$, whereby $X_3$ denotes hydrogen or a lower alkyl group, R represents the radical of a nitrogen heterocycle containing at least one substitutent which can be split off as anion and which is bound to a ring carbon atom adjacent to a tertiary nitrogen atom, $X_1$ represents hydrogen, an alkyl or an alkoxyalkyl group and $X_2$ represents an alkyl or an alkoxyalkyl group having in all at least 4 carbon atoms, whereby $X_1$ and $X_2$ must together contain, when $X_1$ denotes an alkyl or an alkoxyalkyl group, at least 8 carbon atoms, or $X_1$ represents a cyclohexyl radical, unsubstituted or substituted by lower alkyl groups having preferably 1 to 4 carbon atoms, and $X_2$ represents an unsubstituted or substituted alkyl group having at most 18 carbon atoms, a lower alkenyl group having preferably 1 to 4 carbon atoms or a cyclohexyl radical, unsubstituted or substituted by lower alkyl groups having preferably 1 to 4 carbon atoms. Fiber materials dyed with these dyestuffs exhibit very good fastness properties, especially fastness to wet processing, rubbing and drycleaning.

9 Claims, No Drawings

MONO OR DISAZO DYESTUFFS CONTAINING A DIAMINO, HALOTRIAZINYL OR PYRIMIDINYL SUBSTITUENT

DETAILED DISCLOSURE

The present invention relates to new reactive dyestuffs containing no acid, salt-forming, water-solubilizing groups. It also relates to processes for the production of the new reactive dyestuffs which are suitable for the dyeing and printing of organic material, especially hydrophobic fibres, particularly synthetic polyamide fibre material.

It has been found that valuable reactive dyestuffs containing no acid, salt-forming, water-solubilizing groups and which, amongst others, can be applied from organic solvents, especially aprotic solvents, correspond to Formula I,

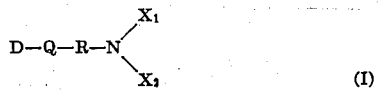

(I)

wherein
D represents the radical of an organic dyestuff,
Q represents the bridging member $-NX_3-$, $-O-$, $-S-$ or $-NX_3CO-$, whereby $X_3$ denotes hydrogen or a lower alkyl group,
R represents the radical of a nitrogen heterocycle containing at least one substituent which can be split off as anion and which is bound to a ring carbon atom adjacent to a tertiary nitrogen atom,
$X_1$ represents hydrogen, an alkyl or an alkoxyalkyl group and
$X_2$ represents an alkyl or an alkoxyalkyl group having in all at least 4 carbon atoms, whereby $X_1$ and $X_2$ must together contain, when $X_1$ denotes an alkyl or an alkoxyalkyl group, at least 8 carbon atoms,
or
$X_1$ represents a cyclohexyl radical, unsubstituted or substituted by lower alkyl groups having preferably 1 to 4 carbon atoms, and
$X_2$ represents an unsubstituted or substituted alkyl group having at most 18 carbon atoms, a lower alkenyl group having preferably 1 to 4 carbon atoms or a cyclohexyl radical, unsubstituted or substituted by lower alkyl groups having preferably 1 to 4 carbon atoms. The new, valuable, water-insoluble reactive dyestuffs of Formula I are obtained by reacting a compound of Formula II, $$Hal - (CO)_{n-1} - R'$$

(II)

wherein
R' represents the radical of a nitrogen heterocycle containing at least two substituents which can be split off as anion,
n represents 1 or 2 and
Hal represents chlorine, bromine or fluorine, with an organic dyestuff of Formula III, $$D - Q'$$

(III)

wherein D has the meaning given under Formula I and

Q' represents $-NHX_3$, $-OH$ or $-SH$, whereby $X_3$ denotes hydrogen or a lower alkyl group, to give a dyestuff of Formula IV, $$D - Q - R'$$

(IV)

wherein D, Q and R' have the meaning given under Formulae I and II,
and subsequently reacting the obtained reaction product with an amine of Formula V,

(V)

wherein
$X_1$ and $X_2$ have the meaning given under Formula I, and thereby selecting the components so that the obtained reactive dyestuff contains no acid, salt-forming, water-solubilizing groups.

A modification of the process according to the invention, for the production of reactive dyestuffs of Formula I, wherein Q represents the bridging member $-NX_3-$, $-o-$ or $-s-$, whereby $X_3$ denotes hydrogen or a lower alkyl group, and for D, R, $X_1$ and $X_2$ that applies which is stated under Formula I, consists in reacting a compound of Formula II, wherein n represents one, and for Hal and R' that applies which is stated above, firstly with an amine of the above mentioned Formula V to give a compound of Formula VI,

(VI)

wherein Hal, R, $X_1$ and $X_2$ have the above given meaning, and subsequently reacting the compound of Formula VI with a dyestuff of Formula III.

The radical of an organic dyestuff D can belong to any desired classes of dyestuffs. The classes of dyestuffs, however, which are primarily to be considered in this case are those which are technically easily accessible. For this reason, D represents in Formula I, e.g. the radical - containing no acid, salt-forming, water-solubilizing groups - of a nitro, acridone, methine, perinone, peridinecarboxylic acid imide, quinophthalone, naphthoquinonimine dyestuff, or the radical of a metal-free or heavy metal-containing phthalocyanine dyestuff and, in particular, the radical of a mono or disazo dyestuff, optionally containing heavy metal, or of an anthraquinone dyestuff.

These radicals of organic dyestuffs can contain substituents common in dyestuffs, which substituents do not dissociate anionically, e.g., halogen atoms such as fluorine, chlorine or bromine; cyano or nitro groups; hydrocarbon groups, especially lower alkyl groups such as methyl, ethyl, isopropyl, tert.butyl, amyl, and lower alkenyl groups; substituted lower alkyl or alkenyl groups, e.g. perfluoro-(lower) alkyl groups such as trifluoromethyl, also hydroxyalkyl groups, e.g., hydroxy-(lower) alkyl such as hydroxyethyl or γ-hydroxypropyl; cyanoethyl or β, β-dicyanovinyl; ether groups, preferably lower alkoxy groups, but also aryloxy groups such as methoxy, ethoxy, butoxy, phenoxy, methylphenoxy; thioether groups, e.g. lower alkylthio or phenylthio groups such as methylthio, ethylthio, phenylthio; acyl groups such as lower alkanoyl, aroyl, lower alkylsulphonyl or arylsulphonyl groups; arylsulphonyloxy groups such as phenylsulphonyloxy groups; primary, secondary or tertiary amino groups; acylamide groups, especially lower alkanoylamide groups such as acetylamide; lower alkoxycarbonylamide groups such as ethoxycarbonylamide, or aroylamide groups such as benzoylamide groups; lower alkylsulphonylamide or arylsulphonylamide groups; carboxylic acid amide and sulphonic acid amide groups, optionally mono- or disubstituted at the nitrogen atom, especially N-loweralkyl- or N,N-di-lower-alkylsulphonic acid amide groups.

In Formula I, Q preferably presents the bridging member —$NX_3$— and $X_3$ represents hydrogen, methyl, ethyl or propyl.

As radical of a nitrogen heterocycle, R represents, in particular, a triazinyl or diazinyl radical, including quinoxaline, phthalazine, quinazoline and pyridazine radical containing as substituent which can be split off as anion, e.g. lower alkylsulphonyl or dinitrophenoxy groups, particularly, however, halogen atoms such as chlorine, bromine or fluorine.

$X_1$ in the meaning of an alkyl or alkoxyalkyl group particularly denotes such groups having from 1 to 18 carbon atoms; if both $X_1$ and $X_2$ represent an alkyl or alkoxyalkyl group, then each of these groups has preferably from 4 to 18, more particularly from 8 to 18 carbon atoms.

As a cyclohexyl radical, optionally substituted by lower alkyl groups, $X_1$ and $X_2$ represent, e.g. the 1- or 4-methylcyclohexyl radical, especially, however, the unsubstituted cyclohexyl radical. If $X_2$ denotes an optionally substituted alkyl radical or an alkenyl radical, then this radical can be both straight-chained and branched. If the alkyl radical $X_2$ is substituted, then suitable substituents are, in particular, hydroxyl, lower alkoxy, lower alkenyloxy and cyano groups. Examples of optionally substituted alkyl groups, denoted by $X_2$, are: methyl, ethyl, 2-hydroxyethyl, isopropyl, sec. butyl, hexyl, octyl, dodecyl, tetradecyl, octadecyl, 2-ethylhexyl, 2-methoxyethyl, 2-ethoxyethyl, 2,2-diethoxyethyl, 2,2-dibutoxyethyl, 2-vinyloxyethyl or 2-cyanoethyl. Examples for $X_2$ as an alkenyl group are the vinyl and allyl radical.

In preferred compounds of Formula I, $X_2$ represents, when $X_1$ denotes hydrogen, particularly an alkyl group having 8 to 18 carbon atoms; if $X_1$ and $X_2$ each represent an alkyl group, then together these preferably contain 8 to 36 carbon atoms.

In particularly preferred compounds of Formula I, however, $X_1$ represents the unsubstituted cyclohexyl radical and $X_2$ represents an unsubstituted alkyl radical having 1 to 4 carbon atoms, especially the methyl or ethyl radical. These preferred compounds are distinguished by their good to excellent solubility in organic solvents.

Here and in the following the expression "lower," in connection with alkyl, alkoxy and alkanoyl groups, denotes radicals having, in general, not more than 4 carbon atoms.

Suitable compound of Formula II, usable in the process according to the invention, are: triazines or diazines having at least three labile halogen atoms, e.g. cyanuric chloride, cyanuric bromide, 2,4,6-trichloropyrimidine or 2,4,6-trifluoro-pyrimidine, 2,4,6-tribromo- or 2,4-difluoro-6-chloro-pyrimidine.

The trihalogenpyrimidine can optionally carry in the 5-position, e.g. the following substituents: chlorine, bromine, cyano, the nitro group, carboxylic acid amide or sulphonic acid amide groups, optionally substituted at the nitrogen atom, carboxylic acid methyl ester or ethyl ester groups; acyl, e.g. benzoyl; alkenyl, e.g. allyl, chlorovinyl, chloro- or bromo-methyl. Examples of such further substituted trihalogenpyrimidines are: 2,-4,5,6-tetrachloropyrimidine, 5-bromo-, 5-cyano-, 5-nitro-, 5-chloromethyl-2,4,6-trichloro- or -trifluoropyrimidine, particularly 5-chloro-2,4,6-trifluoropyrimidine.

Also suitable are dihalogenpyrimidinecarboxylic acid halides, 2,3-dihalogenquinoxalinecarboxylic acid halides, 1,4-dihalogenphthalazinecarboxylic acid halides or 2,4-dihalogenquinazolinecarboxylic acid halides such as, e.g. the carboxylic acid halides of the 2,4-dibromo-, 2,4-difluoro- or, in particular, 2,4-dichloropyrimidine-5- or -6-carboxylic acid, 2,4-dichloro-6-chloromethyl-pyrimidine-5-carboxylic acid, 2,3or 2,3-dichloro-quinoxaline-6-carboxylic acid, 1,4-difluoro-, 1,4-dichloro- or 1,4-dibromophthalazine-6-carboxylic acid, 2,4-dichloro-quinazoline-6- or -7-carboxylic acid or 2,4-dichloropyrimidyl-5-acetic acid.

Further compounds of Formula II are: tetrachloropyridazine-, trichloro-1,2,4-triazine- and 3,6-dichloropyridazine-5-carboxylic acid chloride.

Compounds of Formula II are preferred, wherein Hal represents chlorine, $n$ represents one and R' represents a triazinyl radical having two labile halogen atoms, especially cyanuric chloride; compounds of Formula II, wherein Hal represents chlorine or fluorine, $n$ represents one and R' represents a diazinyl radical having at least two labile halogen atoms, especially 2,4,5,6-tetrachloropyrimidine, 5-chloro-2,4,6-trifluoropyrimidine or 2,4,6-trifluoropyrimidine, or compounds of Formula II, wherein Hal represents chlorine, $n$ represents one and R' represents a diazinyl radical having at least two labile halogen atoms, especially 2,4-dichloropyrimidine-5- or -6-carboxylic acid.

Examples of amines of Formula V, usable in the process according to the invention are: isobutylamine, tert.butylamine, isohexylamine, heptylamine, tert.octylamine, nonylamine, decylamine, undecylamine, tetradecylamine, hexadecylamine, heptadecylamine, octadecylamine and dodecylamine, N-ethyl-N-octadecylamine, N-methyl-N-dodecylamine, dibutylamine, dipentylamine, dihexylamine, dioctylamine, didodecylamine, 2-methoxyethylamine, 2-ethoxyethylamine, 3-methoxy-2-methyl-propylamine, 3-(2-ethylhexoxy)-propylamine, 6-methoxyhexylamine, 3-methoxybutylamine, N,N-diethoxyethylamine, N,N-dibutoxyethylamine, N-methyl-, N-ethyl-, N-propyl-, N-tert.butyl-, N-isoamyl-, N-hexyl-, N-heptyl-, N-nonyl-, N-dodecyl-, N-hexadecyl-, N-octadecyl-, N-oleyl-, N-(2-ethylhexyl)-, N-(2-hydroxyethyl)-, N-(3-hydroxypropyl)-, N-(2-methoxyethyl)-, N-(2-ethoxyethyl)-, N-(2-cyanoethyl)-, N-(2,2-diethoxyethyl)-, N-(2,2-dibutoxyethyl)-, N-(3,3-dimethoxypropyl)-, N-(2-vinyloxyethyl)-, N-vinyl- or N-allylcyclohexylamine, 1-cyclohexylamino-2-propanol, dicyclohexylamine, N-1-dimethylcyclohexylamine, N-isopropyl-1-methyl-cyclohexylamine and N-4-dimethylcyclohexylamine.

For the reaction of a compound of Formula II with a dyestuff of Formula III and of the obtained reaction product of Formula IV with an amine of Formula V, using the process according to the invention, as well as for the reaction of a compound of Formula II, wherein *n* represents one, with an amine of Formula V and of the obtained compound of Formula VI with a dyestuff of Formula III, using the modified process according to the invention, the conditions have to be chosen so that a premature exchange of labile substituents does not occur either as a result of too high a pH-value of the reaction medium or in consequence of too high a temperature. The reaction is performed by methods known per se, e.g. in aqueous suspension, advantageously, however, in an organic solvent, e.g. in an organic solvent which is inert to the reactants, such as acetone, dioxane, methylethyl ketone, ethyl glycol monomethyl ether or -ethyl ether, or in a mixture of such a solvent with water. The reaction is carried out preferably at low temperatures, whereby the choice of the suitable temperature depends principally on the lability of the substituent which can be split off as anion, of the starting materials used. Advantageously, temperatures between 0° and 80°C are used.

In order to neutralize the hydrogen halide being released during the reaction, it is possible to add to the reaction mixture, acid-binding agents such as sodium carbonate, sodium bicarbonate, potassium phosphate, alkali salts of lower fatty acids, e.g. sodium or potassium acetate, ammonium acetate or an excess of the amine of Formula V.

If the reaction is performed in a mixture of an inert organic solvent with water, than it is advantageous to operate at a pH-value between 5 and 9, whereby the pH-value during the reaction is maintained constant by addition of one of the stated acid-binding agents.

The isolation of the dyestuffs, obtainable according to the invention, is performed in the usual manner, e.g. by filtration, concentration of the solvent and filtration, removal by distillation of the solcent and filtration or precipitation from the solvent and filtration.

The drying of the dyestuffs, obtainable according to the invention, is advantageously carried out under mild conditions, i.e., at a moderately elevated temperature and preferably in vacuo.

The reactive dyestuffs of Formula I, which can be produced according to the invention, are suitable for the dyeing and printing of organic material of very diverse kinds, by methods known per se. Suitable as organic material are, in particular, hydrophobic fibres such as fibre material made from linear high-molecular esters of aromatic polycarboxylic acids with polyfunctional alcohols, such as polyethylene glycol terephthalate, cellulose-di- and -tri-acetate fibres, polyvinyl fibres and, in particular, synethetic polyamide fibres.

A particular advantage of the reactive dyestuffs, obtainable according to the invention, is that they are excellently suitable for application from aprotic solvents alone, or from a solvent mixture consisting of aprotic solvent and a liquid, water-soluble, organic solvent which boils below 220°C.

Thereby even and deeply coloured dyeings are obtained on the stated fibre material which, without an alkaline aftertreatment, have very good fastness properties, especially fastness to wet processing, rubbing and dry-cleaning.

Compared to known comparable reactive dyestuffs which contain no alkylamino or alkoxyalkylamino group on the reactive radical or which contain a lower-molecular alkylamino group ot the cyclohexylamino group on said radical, the reactive dyestuffs of Formula I, obtainable according to the invention, are characterised by an appreciably better solubility in an aprotic solvent alone, or in a solvent mixture, e.g. in a solvent mixture consisting of lower aliphatic halogenated hydrocarbons, such as tri- or tetrachloroethylene ("perchloroethylene"), and a liquid, water-soluble or water-miscible organic solvent boiling below 220°C, such as lower alkanols or N,N-dialkylamides of lower monocarboxylic acids. Thereby deeply coloured and fast dyeings are obtained.

The following Examples illustrate the invention. In the Examples, the temperatures are given in degrees Centigrade.

Example 1

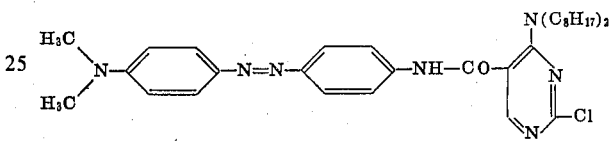

24 g of 4-dimethylamino-4'-amine-1,1'-azobenzene are dissolved neutral in 750 ml of acetone and 370 ml of water. To the solution are added at 0°–5°, 22 g of 2,-4-dichloropyrimidine-5-carboxylic acid chloride and the pH-value is maintained at 6 by the dropwise addition of sodium carbonate solution. After completion of the condensation, the reaction mixture is heated to 30°–35°, 24.1 g of dioctylamine are added and the pH-value is held at 7 – 8, by the subsequent dropwise addition of sodium hydroxide solution, until condensation is completed. The dyestuff of the above formula is completely precipitated by the addition of water, filtered off and washed with water. After being dried in vacuo, the dyestuff is in the form of a yellow powder.

Example 2

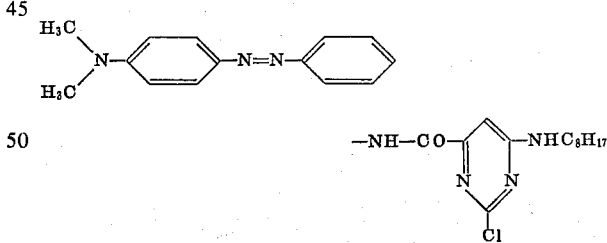

24 g of 4-dimethylamino-4'-amino-1,1'-azobenzene are dissolved in 750 ml of acetone and 370 ml of water. To this solution are added dropwise at 0° – 5° and at a pH-value of 6 – 7, 22 g of 2,4-dichloropyrimidine-6-carboxylic acid chloride in 100 ml of acetone, and sodium carbonate solution is simultaneously added to maintain the pH-value. As soon as condensation is completed, 12.9 g of octylamine are added at 30°–35°, at a pH-value of 7 – 8, and this is maintained at the given value by the subsequent dropwise addition of sodium hydroxide solution. After the reaction is completed, the dyestuff of the above formula is completely precipitated by the addition of water, then filtered and washed with water. After drying of the dyestuff in vacuo, a yellow powder is obtained.

Example 3

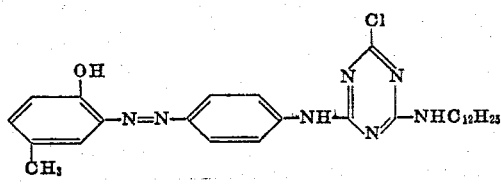

22.7 g of 2-hydroxy-5-methyl-4'-amino-1,1'-azobenzene are dissolved in 750 ml of acetone and 370 ml of water at a pH-value of 7. At 30°–35°, a solution of 33.3 g of 2-dodecylamino-4,6-dichloro-1,3,5-triazine in 300 ml of acetone is then added and, by the simultaneous addition of sodium carbonate solution, the pH-value is maintained between 6 and 7. After completion of the condensation, the dyestuff of the above formula is completely precipitated by the addition of water, filtered and washed with water. The dyestuff, after being dried in vacuo, is in the form of a yellow powder.

Example 4

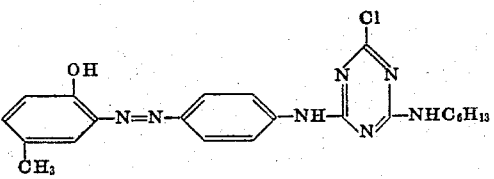

22.7 g of 2-hydroxy-5-methyl-4'-amino-1,1'-azobenzene are dissolved in 750 ml of acetone and 370 ml of water at a pH-value of 6.5 – 7. To this solution are added dropwise within 30 minutes at 0°–5°, 18.4 g of cyanuric chloride dissolved in 100 ml of acetone. An aqueous sodium carbonate solution is simultaneously added dropwise in such a manner that the reaction remains always neutral. After completion of the condensation, the temperature is raised to 30° with the simultaneous addition of, in all, 20.2 g of hexylamine, at a pH-value of 7 – 8. After completion of the reaction, the dyestuff of the above formula is completely precipitated by the yellow suspension being poured on to water. The dyestuff is then filtered and washed with water. After being dried in vacuo, it is in the form of a yellow powder.

Further dyestuffs are listed in the following Table I which can be produced by the above described process. In the last column of the table, the shades are given of the dyeings obtained with the corresponding dyestuffs on polyamide-6.6 fabric.

TABLE I

| Example number | Dyestuff | Shade on polyamide-6.6 |
|---|---|---|
| 5 | [structure] | Yellow. |
| 6 | [structure] | Do. |
| 7 | [structure] | Do. |
| 8 | [structure] | Do. |
| 9 | [structure] | Do. |

TABLE I—Continued

| Example number | Dyestuff | Shade on polyamide-6.6 |
|---|---|---|
| 10 | [structure: 3-amino-5-methylpyrazole azo coupled to phenyl-NH-(chloro-triazine)-NH-C₁₈H₃₇] | Do. |
| 11 | [structure: 2-chloro-4-nitrophenyl-azo-(3-methyl-5-hydroxy-pyrazole-1-yl)phenyl-NH-(chloro-triazine)-N(C₄H₉)₂] | Do. |
| 12 | [structure: 4-chloro-2-nitrophenyl-azo-(3-methyl-5-hydroxy-pyrazole-1-yl)phenyl-NH-(chloro-triazine)-NHC₁₂H₂₅] | Do. |
| 13 | [structure: 4-ethylsulfonyl-2-nitrophenyl-azo-(3-methyl-5-hydroxy-pyrazole-1-yl)phenyl-NH-(chloro-triazine)-NH-C(CH₃)₂CH₂C(CH₃)₃] | Orange. |
| 14 | [structure: 4-methylsulfonyl-2-nitrophenyl-azo-phenyl(NHCOCH₃)-N(C₂H₅)-CO-(chloro-pyrimidine)-NHC₁₆H₃₃] | Red. |
| 15 | [structure: 2-chloro-4,6-dinitrophenyl-azo-phenyl(NHCO-OC₂H₅)-N(CH₂CH₂OH)-CH₂CH₂NH-(chloro-triazine)-N(C₈H₁₇)₂] | Bluish red. |
| 16 | [structure: 4-nitrophenyl-azo-phenyl-N(C₂H₅)-CO-(chloro-pyrimidine)-N(C₅H₁₁)₂] | Yellow. |
| 17 | [structure: 2-chloro-4-nitrophenyl-azo-phenyl-N(CH₂CH₂OH)-CH₂CH₂NH-(chloro-triazine)-N(CH₃)C₁₂H₂₅] | Claret. |
| 18 | [structure: 2,4-dinitrophenyl-azo-phenyl-N(CH₂CH₂OH)-CH₂CH₂NH-(chloro-triazine)-NH-CH(CH₃)(CH₂)₅CH₃] | Violet. |
| 19 | [structure: 2-cyano-4-nitrophenyl-azo-phenyl-N(CH₂CH₂CN)-CH₂CH₂NH-(chloro-triazine)-N(C₂H₅)C₈H₁₇] | Do. |
| 20 | [structure: 4-methylsulfonyl-2-nitrophenyl-azo-phenyl-N(CH₂CH₂CN)-CH₂CH₂NH-(chloro-triazine)-NH(CH₂)₃-CH(CH₃)₂] | Red. |

TABLE I—Continued

| Example number | Dyestuff | Shade on polyamide-6.6 |
|---|---|---|
| 21 | (structure) | Claret. |
| 22 | (structure) | Orange. |
| 23 | (structure) | Violet. |
| 24 | (structure) | Yellowish orange. |
| 25 | (structure) | Bluish red. |
| 26 | (structure) | Violet. |
| 27 | (structure) | Yellow. |
| 28 | (structure) | Do. |
| 29 | (structure) | Do. |
| 30 | (structure) | Red. |
| 31 | (structure) | Red. |

TABLE I—Continued

| Example number | Dyestuff | Shade on polyamide-6.6 |
|---|---|---|
| 32 | (structure with chloropyrimidine, $(C_3H_7)_2N$, F, $-HNCH_2CH_2N$, phthaloyl, $-N=N-$, aryl with $CH_3$, $N(CH_2CH_2OH)_2$) | Reddish yellow. |
| 33 | (structure: $C_{15}H_{21}NH$-triazine-Cl, $-NH-$aryl-Cl, $-N=N-$, aryl, $N(C_2H_5)(CH_2CH_2OH)$) | Yellow. |
| 34 | (structure: $C_9H_{19}NH$-triazine-Cl, $-NH-$aryl(Cl,Cl), $-N=N-$, aryl-$NHCOCH_3$, $N(CH_2CH_2OH)_2$) | Orange. |
| 35 | (structure: Cl-pyrazine-$N(C_4H_9)_2$, $-CO-HN-$aryl-CN, $-N=N-$, aryl-$OCH_3$, $N(CH_2CH_2CN)(C_2H_5)$) | Reddish yellow. |
| 36 | (structure: $NH(C_6H_{13})_2$, Cl-pyrimidine, $-COHN-$aryl-$SO_2C_2H_5$, $-N=N-$, aryl, $N(CH_2CH_2OH)_2$) | Do. |
| 37 | (structure: Cl-phthalazine-$NH-C_{18}H_{37}$, $-SO_2NH-$aryl(Cl,Br), $-N=N-CH$, phthaloyl) | Yellow. |
| 38 | (structure: $C_{14}H_{29}NH$-triazine-Cl, $-HN-$aryl-CN, $-N=N-$, 4-hydroxy-1-methyl-2-quinolone) | Reddish yellow. |
| 39 | (structure: $C_{16}H_{33}NH$-triazine-Cl, $-HN-$aryl, $-N=N-CH$, naphthalene dicarbonyl) | Yellow. |
| 40 | (structure: $C_6H_{13}NH$-triazine-Cl, $-HN-$aryl-Br, $-N=N-$, aryl, $N(CH_2CH_2CN)_2$) | Red. |
| 41 | (structure: $O_2N$-aryl-CN, $-N=N-$, aryl-$N(CH_3)(CH_2CH_2NHCO-)$, quinoxaline with Cl and $N(C_4H_9)_2$) | Violet. |
| 42 | (structure: $O_2N$-aryl(Cl,Cl), $-N=N-$, aryl-$N(CH_2CH_2OH)(CH_2CH_2NH-)$, triazine with Cl and $NHC_{17}H_{35}$) | Brown. |
| 43 | (structure: $O_2N$-aryl-CN, $-N=N-$, aryl-$N(CH_3)-$triazine with Cl and $N(C_{12}H_{25})_2$) | Yellow. |

TABLE I—Continued

| Example number | Dyestuff | Shade on polyamide-6.6 |
|---|---|---|
| 44 | [structure: dicyanovinyl-tolyl-N(CH$_3$)(C$_2$H$_2$CH$_2$NH–triazine-Cl, N(C$_3$H$_9$)$_2$)] | Greenish yellow. |
| 45 | [structure: dicyanovinyl-tolyl-N(C$_4$H$_9$)(CH$_2$CH$_2$NH–triazine-Cl, NH–CH$_2$CH(CH$_3$)$_2$)] | Do. |
| 46 | [structure: HO–C$_6$H$_4$–N=N–C$_6$H$_3$(CH$_3$)–N=N–C$_6$H$_4$–NHCO–pyrazine(Cl, NH–C$_{12}$H$_{25}$)] | Yellow. |
| 47 | [structure: (CH$_3$)$_2$N–C$_6$H$_4$–N=N–C$_6$H$_4$–N=N–C$_6$H$_4$–NH–triazine(Cl, NH–C$_{18}$H$_{37}$)] | Reddish yellow. |
| 48 | [structure: anthraquinone–NH–C$_6$H$_4$–NH–triazine(Cl, N(C$_8$H$_{17}$)$_2$)] | Red-violet. |
| 49 | [structure: naphthoxazine-anthraquinone fused system–NH–triazine(N(C$_{12}$H$_{25}$)$_2$, Cl)] | Greenish blue. |
| 50 | [structure: 1-NHCH$_3$-4-(NH–C$_6$H$_4$–NH–triazine(Cl, NH(CH$_2$)$_3$–CH(CH$_3$)$_2$))-anthraquinone] | Blue. |
| 51 | [structure: 1,4-bis(2,6-dimethylanilino)-5-(NH–triazine(NH–C(CH$_3$)$_3$))-anthraquinone] | Green. |

TABLE I—Continued
| Example number | Dyestuff | Shade on polyamide-6.6 |
|---|---|---|
| 52 | 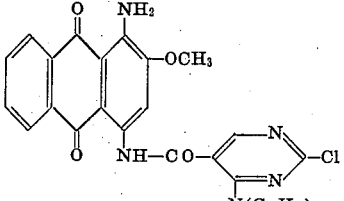 | Red. |
| 53 | 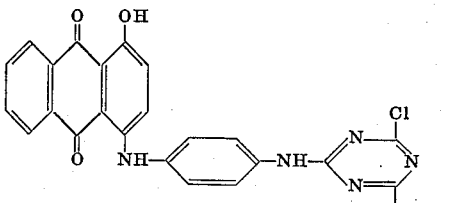 | Violet. |
| 54 | 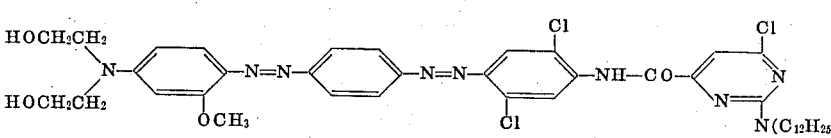 | Red. |
| 55 | 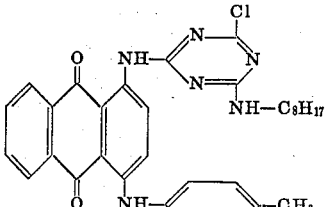 | Red-violet. |
| 56 | 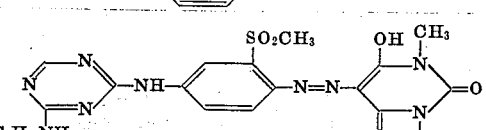 | Yellow |
| 57 | 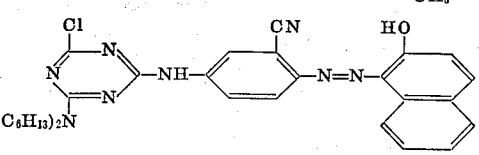 | Orange |
| 58 | 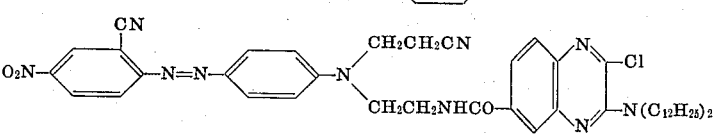 | Violet. |
| 59 | 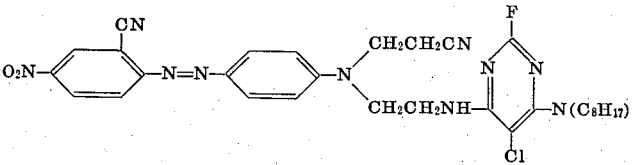 | Do. |
| 60 | 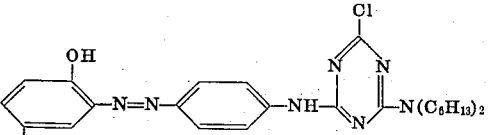 | Yellow. |
| 61 | 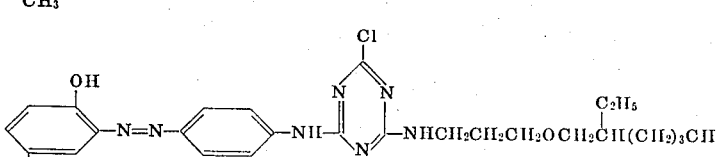 | Do. |

TABLE I—Continued

| Example number | Dyestuff | Shade on polyamide-6.6 |
|---|---|---|
| 62 | 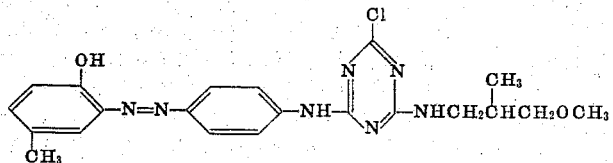 | Do. |

Example 63

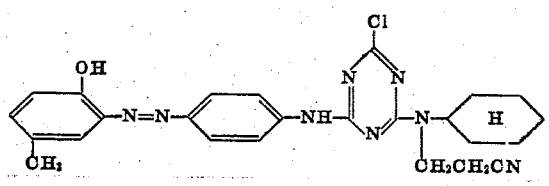

22.7 g of 2-hydroxy-5-methyl-4'-amino-1,1'-azobenzene are dissolved in 800 ml of acetone and 400 ml of water and the pH-value of the solution is adjusted to 7. To this solution are added dropwise within 30 minutes at 30°–40°, 30 g of 2,4-dichloro-6-[N-2-cyanoethyl-N-cyclohexylamino]-1,3,5-triazine dissolved in 400 ml of acetone. The pH-value of the reaction mixture is maintained between 6 and 7 by the simultaneous dropwise addition of aqueous 2N sodium hydroxide solution. After completion of the condensation, the dyestuff of the above formula is precipitated by addition of water, then filtered and washed with water. After being dried in vacuo, the dyestuff is in the form of a yellow powder.

Example 64

22.7 g of 2-hydroxy-5-methyl-4'-amino-1,1'-azobenzene are dissolved in 800 ml of acetone and 400

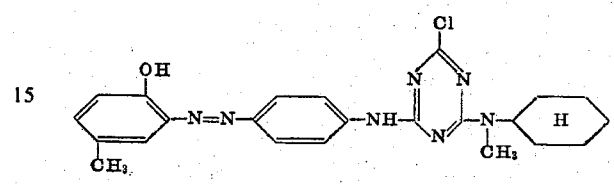

ml of water and the solution is adjusted to a pH-value of 6 to 7. To this solution are added dropwise in the course of 30 minutes at 0°–5°, 18.4 g of cyanuric chloride, dissolved in 100 ml of acetone, and, simultaneously, an aqueous 2N sodium hydroxide solution so that, in this way, the pH-value of the reaction solution always remains between 6 and 7. As soon as no further aminoazo dyestuff is detectable, 11.3 g of N-methylcyclohexylamine are added to the reaction mixture, the temperature is raised to 30°–40° and the pH-value of the solution kept between 6.5 and 7.5 by the occasional addition of 1N sodium hydroxide solution. After the reaction is completed, the dyestuff of the above formula is precipitated by the suspension being poured on to water. The dyestuff is afterwards filtered and the suction-filter residue washed with water. After drying in vacuo, the dyestuff is in the form of a yellow powder.

In the following Table II, further dyestuffs are listed which can be produced by the above described process. In the last column of the Table, the shades of the dyeings are given which are obtained with the corresponding dyestuffs on polyamide-6.6 fabric.

TABLE II

| Example number | Dyestuff | Shade on polyamide-6.6 |
|---|---|---|
| 65 | 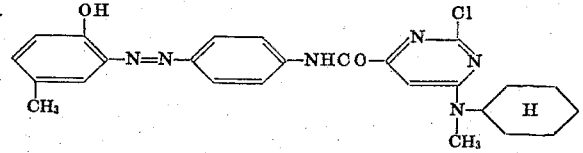 | Yellow. |
| 66 | 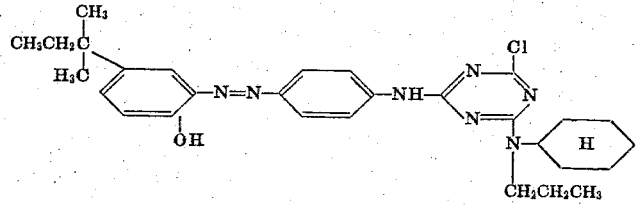 | Do. |
| 67 | 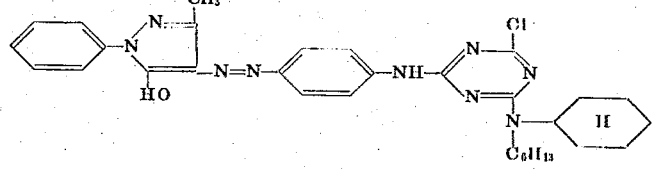 | Do. |

TABLE II—Continued

| Example number | Dyestuff | Shade on polyamide-6.6 |
|---|---|---|
| 68 | (structure: 1-phenyl-3-chloro-5-amino-pyrazole azo to phenyl-NH-triazine(Cl)(N(cyclohexyl)(CH₂CH₂CH(CH₃)₂))) | Do. |
| 69 | (structure: 3-methyl-5-amino-pyrazole (NH) azo to phenyl-NH-triazine(Cl)(N(cyclohexyl)(C₁₈H₃₇))) | Do. |
| 70 | (structure: 2-chloro-4-nitrophenyl azo to 3-methyl-5-hydroxy-1-(phenyl)-pyrazole, phenyl-NH-triazine(Cl)(N(cyclohexyl)(C₄H₉))) | Do. |
| 71 | (structure: 4-chloro-2-nitrophenyl azo to 3-methyl-5-hydroxy-1-(phenyl)-pyrazole, phenyl-NH-triazine(Cl)(N(cyclohexyl)(C₁₂H₂₅))) | Do. |
| 72 | (structure: 4-ethylsulfonyl-2-nitrophenyl azo to 3-methyl-5-hydroxy-1-(phenyl)-pyrazole, phenyl-NH-triazine(Cl)(N(cyclohexyl)(CH₂CH(C₂H₅)(CH₂)₃CH₃))) | Orange. |
| 73 | (structure: 4-methylsulfonyl-2-nitrophenyl azo to phenyl (NHCOCH₃) N(C₂H₅)-CO-pyrimidine(Cl)(N(cyclohexyl)(C₁₆H₃₃))) | Red. |
| 74 | (structure: 2,6-dichloro-4-nitrophenyl azo to phenyl (NHCOOC₂H₅) N(CH₂CH₂OH)(CH₂CH₂NH-triazine(Cl)(N(cyclohexyl)(C₈H₁₇)))) | Bluish red. |
| 75 | (structure: 4-nitrophenyl azo to phenyl-N(C₂H₅)-CO-pyrimidine(Cl)(N(cyclohexyl)(C₅H₁₁))) | Yellow. |

TABLE II—Continued
| Example number | Dyestuff | Shade on polyamide-6.6 |
|---|---|---|
| 76 | 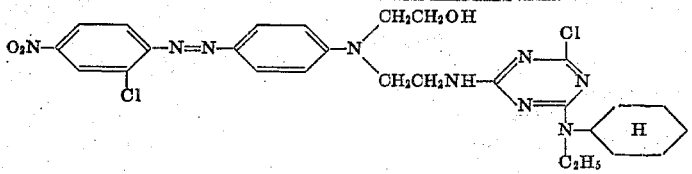 | Claret. |
| 77 | 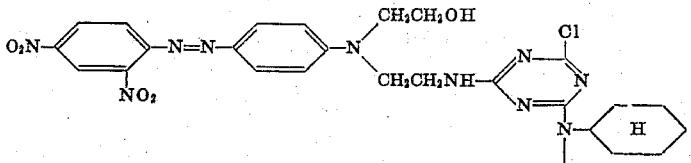 | Violet. |
| 78 | 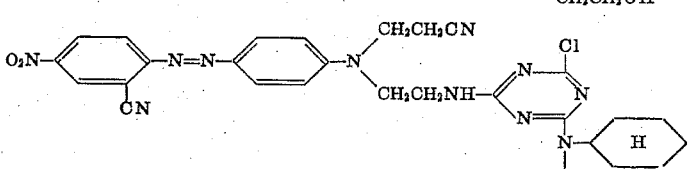 | Do. |
| 79 | 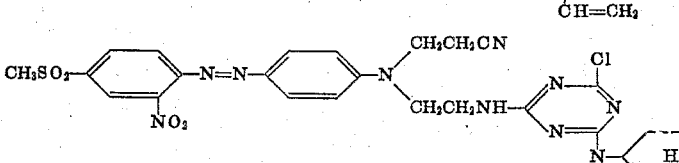 | Red. |
| 80 | 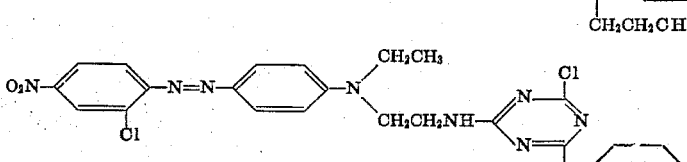 | Claret. |
| 81 | 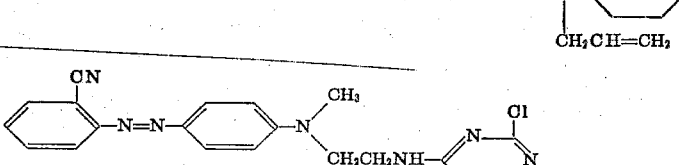 | Orange. |
| 82 | 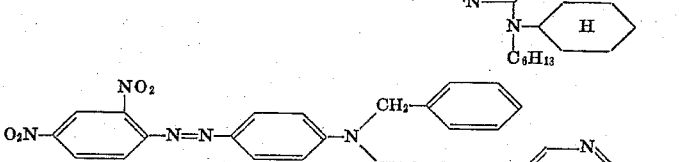 | Violet. |
| 83 | 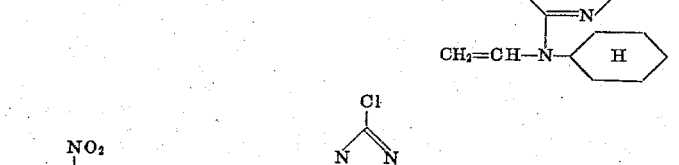 | Yellowish orange. |
| 84 | 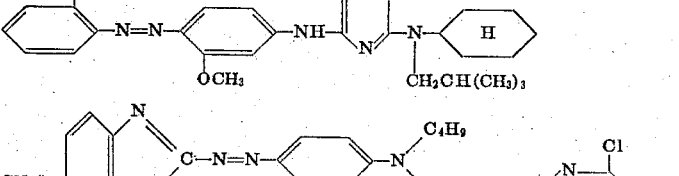 | Blueish red. |

TABLE II—Continued

| Example number | Dyestuff | Shade on polyamide-6.6 |
|---|---|---|
| 85 | (structure) | Violet. |
| 86 | (structure) | Yellow. |
| 87 | (structure) | Do. |
| 88 | (structure) | Do. |
| 89 | (structure) | Red. |
| 90 | (structure) | Red. |
| 91 | (structure) | Reddish yellow. |
| 92 | (structure) | Yellow. |
| 93 | (structure) | Orange. |
| 94 | (structure) | Reddish yellow. |

TABLE II—Continued

| Example number | Dyestuff | Shade on polyamide-6.6 |
|---|---|---|
| 95 | [structure] | Do. |
| 96 | [structure] | Yellow. |
| 97 | [structure] | Reddish yellow. |
| 98 | [structure] | Yellow. |
| 99 | [structure] | Red. |
| 100 | [structure] | Violet. |
| 101 | [structure] | Brown. |
| 102 | [structure] | Yellow. |
| 103 | [structure] | Greenish yellow. |

TABLE II—Continued

| Example number | Dyestuff | Shade on polyamide-6.6 |
|---|---|---|
| 104 | (structure: dicyanovinyl-phenyl-N(C4H9)(CH2CH2NHCO-triazine with Cl, N(H)(cyclohexyl)(C16H33))) | Do. |
| 105 | HO–C6H4–N=N–C6H3(CH3)–N=N–C6H4–NHCO–pyrimidine(Cl, N(CH3)(cyclohexyl)(H)) | Yellow. |
| 106 | (CH3)2N–C6H4–N=N–C6H4–N=N–C6H4–NH–triazine(Cl, N(cyclohexyl)(C2H5)(H)) | Reddish yellow. |
| 107 | (anthraquinone–NH–C6H4–NH–triazine(Cl, N(cyclohexyl)(CH2CH2CN)(H))) | Red-violet. |
| 108 | (phenoxazine-anthraquinone–NH–triazine(Cl, N(CH3)(cyclohexyl)(CH(CH3)2))) | Greenish blue. |
| 109 | (1-NHCH3-4-NH-phenyl-anthraquinone, phenyl–NH–triazine(Cl, N(CH2CH2OH)(cyclohexyl))) | Blue. |
| 110 | (1,5-bis(2,6-dimethylphenylamino)-anthraquinone–NH–triazine(Cl, N(cyclohexyl)(CH=CH2))) | Green. |

TABLE II—Continued

| Example number | Dyestuff | Shade on polyamide-6.6 |
|---|---|---|
| 111 | (structure: 1-amino-2-methoxy-4-[(2-chloropyrimidinyl) carbonylamino]anthraquinone with N(cyclohexyl)(CH₂CH₂CN)) | Red. |
| 112 | (structure: 1-hydroxy-4-{[4-((4-chloro-triazinyl)-N(cyclohexyl)(CH₃)amino)phenyl]amino}anthraquinone) | Violet. |
| 113 | (structure: 1,4-diaminoanthraquinone with chloro-triazine-N(cyclohexyl)(CH₂CH₂OCH₃) and p-tolylamino) | Red-violet. |
| 114 | (structure: chloro-triazine with N(cyclohexyl)(CH₂OCH₃), NH-phenyl(SO₂CH₃)-N=N-barbituric acid) | Yellow. |
| 115 | (structure: chloro-triazine with N(cyclohexyl)(CH₂CH₂OH), NH-phenyl(CN)-N=N-(2-hydroxynaphthyl)) | Orange. |
| 116 | (structure: O₂N–C₆H₃(CN)–N=N–C₆H₄–N(CH₂CH₂CN)(CH₂CH₂NHCO-quinoxalinyl chloro-N(cyclohexyl)(CH=CH₂))) | Violet. |
| 117 | (structure: O₂N–C₆H₃(CN)–N=N–C₆H₄–N(CH₂CH₂CN)(CH₂CH₂NH-fluoropyrimidinyl chloro-N(cyclohexyl)(CH₂CH₂CN))) | Do. |
| 118 | (structure: (HOCH₂CH₂)₂N–C₆H₃(OCH₃)–N=N–C₆H₂Cl₂–NH–triazine(Cl)-N(C(CH₃)₂-cyclohexyl)(CH₃)) | Red. |
| 119 | (structure: O₂N–C₆H₄–N=N–C₆H₃(NO₂)–N(C₂H₅)-pyrimidine(Cl,Cl)-N(cyclohexyl)(CH₃)) | Red. |

Example 120

8 g of the dyestuff, produced according to Example 60, are dissolved in 1000 g of trichloroethylene. With this solution a fabric made from polyamide-6.6 is impregnated at room temperature, the fabric squeezed out to give a dye liquor absorption of ca. 75 percent, relative to the dry weight of the material, and the impregnated material then dried at 80° in an air stream. The dyestuff is afterwards thermofixed during 5 minutes at 170°.

Without aftertreatment, an even and well developed yellow dyeing is obtained having good fastness to wet processing and to rubbing.

If, instead of 1000 g of trichloroethylene, the same amount of chlorobenzene is used, then likewise is obtained a deeply coloured, well developed, yellow and fast dyeing.

Example 121

8 g of the dyestuff, produced according to Example 64, are dissolved in 1000 g of trichloroethylene. A fabric made from polyamide-6.6 is impregnated at room temperature with this solution. The fabric is squeezed out to a dye liquor absorption of ca. 75 percent, relative to the dry weight of the material, and the impregnated material is then dried at 80° in an air stream. The dyestuff is afterwards thermofixed during 3 minutes at 170°.

Without aftertreatment, an even and well developed yellow dyeing is obtained having good fastness to wet processing and to rubbing.

If, instead of the 1000 g of trichloroethylene, the same amount of chlorobenzene is used, then likewise is obtained a deeply coloured, well developed, fast, yellow dyeing.

What we claim is:

1. A reactive dyestuff, containing no acid, saltforming, water-solubilizing groups, of the formula

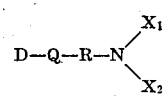

wherein
D represents the radical of a monazo or disazo dyestuff, unsubstituted or substituted only by halogen, cyano, nitro, lower alkyl, lower alkenyl, perfluoro(-lower)alkyl, hydroxy-(lower)alkyl, cyanoethyl, $\beta,\beta$-dicyanovinyl, lower alkoxy, phenoxy, methylphenoxy, lower alkylthio, phenylthio, lower alkanoyl, lower alkylsulphonyl, phenylsulfonyloxy, dimethylamino, amino, N-($\beta$-cyanoethyl)-ethylamino, diethylamino, methylethylamino, ethylbenzylamino, ethylbutylamino, N-($\beta$-hydroxyethyl)ethylamino, $\beta$-hydroxyethylamino, di($\beta$-hydroxyethyl)amino, N-($\beta$-cyanoethyl)-$\beta$-hydroxyethylamino, di($\beta$-cyanoethyl)amino, anilino, oxyanilino, methylamino, dimethylanilino, methylanilino, lower alkanoylamide, lower alkoxycarbonylamide, benzoylamide, lower alkylsulphonylamide, N-loweralkyl- and N,N-diloweralkyl-lower alkylsulphonylamide, hydroxy or phenyl,
represents a bridging member $-NX_3-$, $-O-$, $-S-$ or $-NX_3CO-$, whereby $X_3$ represents hydrogen or lower alkyl, represents diazinyl or triazinyl containing only chlorine, bromine or fluorine substituents, each of which can be split off as anion and which is bound to a ring carbon atom adjacent to a tertiary nitrogen atom,
$X_1$ & $X_2$ represent the same or different alkyl or alkoxyalkyl wherein $X_1$ and $X_2$ must together contain from 8 to 36 carbon atoms,
or
$X_1$ represents cyclohexyl or cyclohexyl substituted by lower alkyl, and
$X_2$ represents alkyl of 1 to 18 carbon atoms, alkyl of 1 to 18 carbon atoms substituted by a member selected from the group consisting of hydroxyl, lower alkoxy, lower alkenyloxy and cyano, lower alkenyl, cyclohexyl or cyclohexyl substituted by lower alkyl.

2. A reactive dyestuff as claimed in claim 1, wherein Q represents the $-NX_3-$ group, R represents triazinyl having one labile halogen atom or diazinyl having at least one labile halogen atom, $X_1$ and $X_2$ each represent an alkyl group which together contain from 8 to 36 carbon atoms, or $X_1$ represents cyclohexyl and $X_2$ represents an alkyl having from 1 to 4 carbon atoms.

3. A reactive dyestuff as claimed in claim 1 wherein Q represents the $-NX_3CO-$ group, R represents diazinyl having at least one labile halogen atom, $X_1$ and $X_2$ each represent an alkyl group which together contain from 8 to 36 carbon atoms, or $X_1$ represents cyclohexyl and $X_2$ represents alkyl having from 1 to 4 carbon atoms.

4. A reactive dyestuff as claimed in claim 2 wherein R represents chlorotriazinyl, 2,5-dichloropyrimidyl or 2-fluoro-5-chloropyrimidyl.

5. A reactive dyestuff as claimed in claim 3 wherein R represents 2-chloropyrimidyl-5, or 2-chloropyrimidyl-6.

6. The reactive dyestuff as claimed in claim 1, which is of the formula

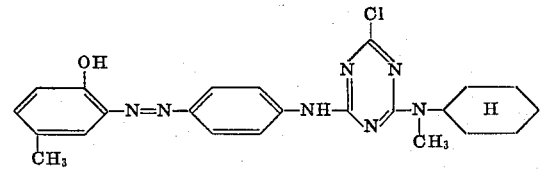

7. The reactive dyestuff as claimed in claim 1, which is of the formula

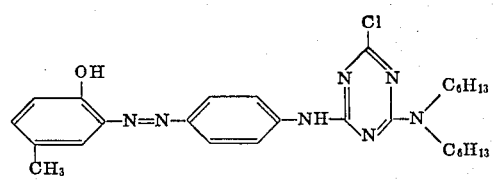

8. The reactive dyestuff as claimed in claim 1, which is of the formula

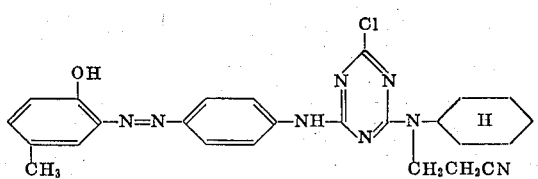

9. The reactive dyestuff as claimed in claim 1, which is of the formula

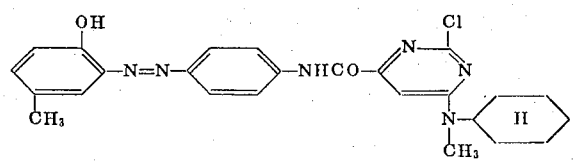

* * * * *

UNITED STATES PATENT OFFICE
CERTIFICATE OF CORRECTION

Patent No. 3,843,624                 Dated October 22, 1974

Inventor(s) Herbert Seiler and Paul Dussy

It is certified that error appears in the above-identified patent and that said Letters Patent are hereby corrected as shown below:

In lines 21 and 22 of claim 1 (counting the formula as one line), change "and N,N-diloweralkyl-lower alkylsulphonylamide" to --or N,N-diloweralkyl-sulphonylamide--.

In line 23 of claim 1 (counting the formula as one line) insert --Q-- before "represents".

Rewrite lines 25 and 26 of claim 1 (counting the formula as one line) as follows:

--drogen or lower alkyl,

R represents diazinyl or triazinyl containing only chlorine, bromine or fluorine--.

Signed and Sealed this

Twenty-eighth Day of June 1977

[SEAL]

Attest:

RUTH C. MASON
*Attesting Officer*

C. MARSHALL DANN
*Commissioner of Patents and Trademarks*